United States Patent [19]

Matsushita et al.

[11] Patent Number: 5,609,547
[45] Date of Patent: Mar. 11, 1997

[54] ENGINE OVERRUN PREVENTING SYSTEM FOR A VEHICLE

[75] Inventors: Shigenori Matsushita; Shigeru Yamamoto; Shu huai Zhang; Satoru Nishita; Kazushi Nakata, all of Osaka, Japan

[73] Assignee: Kabushiki Kaisha Komatsu Seisakusho, Tokyo, Japan

[21] Appl. No.: 325,869

[22] Filed: Oct. 19, 1994

[30] Foreign Application Priority Data

Oct. 20, 1993 [JP] Japan .................................. 5-262639
Sep. 22, 1994 [JP] Japan .................................. 6-227840

[51] Int. Cl.$^6$ .................................................. B60K 41/04
[52] U.S. Cl. .................................................. 477/110; 477/107
[58] Field of Search .................................. 477/107, 110, 477/174, 175, 90, 92

[56] References Cited

U.S. PATENT DOCUMENTS 4,133,326  1/1979  Cops et al. .
5,287,773  2/1994  Nakawaki et al. .................. 477/110 X Primary Examiner—Carl D. Friedman
Assistant Examiner—Creighton Smith
Attorney, Agent, or Firm—Armstrong, Westerman, Hattori, McLeland & Naughton

[57] ABSTRACT

An engine overrun preventing system for a vehicle, in which the overrun of an engine is prevented when the overrun of the engine is detected, by (i) switching a lock-up system provided in a torque convertor OFF to cause a slip, if it is detected that the lock-up system is in its ON state; (ii) shifting a transmission into a speed range which is one grade lower than a presently selected speed range and reducing vehicle speed by engine brake, if it is detected that the lock-up system is in its OFF state and that the transmission is placed in another speed range than a first speed; and (iii) actuating a brake to reduce vehicle speed, if it is detected that the lock-up system is in its OFF state and that the transmission is placed in the first speed and if a detected vehicle speed is equal to a predetermined vehicle speed or more.

8 Claims, 5 Drawing Sheets

ENGINE OVERRUN PREVENTING SYSTEM FOR A VEHICLE

BACKGROUND OF THE INVENTION (1) Field of the Invention

The present invention relates to an engine overrun preventing system for use in a track-laying vehicle such as a bulldozer, hydraulic excavator or crane, and particularly to an engine overrun preventing system suitable for use in a bulldozer.

(2) Description of the Prior Art

When a bulldozer rolls down a slope, for example, running of the bulldozer is accelerated by its own weight etc., so that the engine is reversely driven, overrunning at a revolution speed beyond the allowable range specified in its specification.

In prior art, if the engine is left in such an overrunning condition, it may cause an engine failure or damage to the engine. In order to prevent the overrun of the engine, the operator has to check and judge on each occasion whether the engine is in the overrun condition and operate a brake or other means to reduce the revolution speed of the engine.

SUMMARY OF THE INVENTION

Such a measure for preventing the overrun of an engine, however, presents the disadvantage that since the operator has to judge by himself whether the engine is in the overrunning condition and to operate a brake or other means based on his judgment, the operator is bothered by the troublesome judgment and operation. Furthermore, there is a likelihood that the operator makes a misjudgment, which may lead not only to an engine failure but also damage to the expensive engine.

The invention has been made with the above problems in view, and therefore one of the objects of the invention is to provide an engine overrun preventing system for a vehicle which can be operated without requiring the operator's judgment as to whether the engine is in the overrunning condition, for example, when the vehicle moves down a slope. Further, the system according to the invention is easy to operate when the vehicle is running on a slope etc. so that the operator feels at ease in the operation, and prevents an engine failure or damage due to the overrun of the engine.

In accomplishing these and other objects, there is provided, according to the invention, an engine overrun preventing system for a vehicle which basically comprises:

(a) overrun detector means for detecting the overrun of an engine; and (b) overrun control means for preventing the overrun of the engine when the overrun of the engine is detected by the overrun detector means, by actuating a brake to reduce vehicle speed.

There is provided another embodiment of the overrun preventing system for a vehicle comprising:

(a) lock-up state detector means for detecting the ON or OFF state of a lock-up system provided in a torque convertor;

(b) overrun detector means for detecting the overrun of an engine; and (c) overrun control means for preventing the overrun of the engine when the overrun of the engine is detected by the overrun detector means, by switching the lock-up system of the torque convertor OFF to cause a slip if the lock-up state detector means detects that the lock-up system is in its ON state.

There is provided still another embodiment of the overrun preventing system for a vehicle comprising:

(a) speed range detector means for detecting a speed range in which an automatic transmission is presently placed;

(b) overrun detector means for detecting the overrun of an engine; and (c) overrun control means for preventing the overrun of the engine when the overrun of the engine is detected by the overrun detector means, by shifting the transmission into a speed range which is one grade lower than the detected speed range and reducing the vehicle speed by engine brake, if the speed range detector means detects that the transmission is placed in another speed range than a first speed.

According to the invention, when the overrun of the engine is detected by the overrun detector means, the overrun control means reduces the revolutions of the engine caused by its reverse drive, by (1) actuating the brake to reduce vehicle speed; and/or (2) switching the lock-up system of the torque convertor OFF to cause a slip, if the lock-up state detector means detects that the lock-up system is in its ON state; and/or (3) shifting the automatic transmission into a speed range which is one grade lower than a presently selected speed range and reducing the vehicle speed by engine brake, if the speed range detector means detects that the automatic transmission is placed in another speed range than the first speed. Such an engine overrun preventing system for a vehicle can be easily operated when the vehicle is running on a slope etc. so that the operator feels at ease during the operation. Further, with such a system, an engine failure and/or damage due to the overrun of the engine can be securely prevented.

In the case where the vehicle includes a torque convertor with a lock-up system, the engine overrun preventing system for a vehicle preferably comprises:

(a) lock-up state detector means for detecting the ON or OFF state of a lock-up system provided in a torque convertor;

(b) overrun detector means for detecting the overrun of an engine; and (c) overrun control means for preventing the overrun of the engine when the overrun of the engine is detected by the overrun detector means, by (i) switching the lock-up system OFF to cause a slip, if the lock-up state detector means detects that the lock-up system of the torque convertor is in its ON state; and (ii) actuating a brake to reduce vehicle speed, if the lock-up state detector means detects that the lock-up system of the torque convertor is in its OFF state.

In the case where the vehicle includes an automatic transmission, the engine overrun preventing system for a vehicle preferably comprises:

(a) speed range detector means for detecting a speed range in which an automatic transmission is presently placed;

(b) overrun detector means for detecting the overrun of an engine; and (c) overrun control means for preventing the overrun of the engine when the overrun of the engine is detected by the overrun detector means, by (i) shifting the transmission into a speed range which is one grade lower than the detected speed range and reducing the vehicle speed by engine brake if the speed range detector means detects that the transmission is placed in another speed range than a first speed and (ii)actuating a brake to reduce vehicle speed if the speed range detector means detects that the transmission is placed in the first speed.

In the case where the vehicle includes both a torque convertor with a lock-up system and an automatic transmission, the engine overrun preventing system for a vehicle preferably comprises:

(a) lock-up state detector means for detecting the ON or OFF state of a lock-up system provided in a torque convertor;

(b) speed range detector means for detecting a speed range in which an automatic transmission is presently placed;

(c) overrun detector means for detecting the overrun of an engine; and (d) overrun control means for preventing the overrun of the engine when the overrun of the engine is detected by the overrun detector means, by (i) switching the lock-up system OFF to cause a slip, if the lock-up state detector means detects that the lock-up system of the torque convertor is in its ON state; (ii) shifting the transmission into a speed range which is one grade lower than the detected speed range and actuating an engine brake to reduce vehicle speed, if the lock-up state detector means detects that the lock-up system of the torque convertor is in its OFF state and the speed range detector means detects that the transmission is placed in another speed range than a first speed; and (iii) reducing the vehicle speed by engine brake if the lock-up state detector means detects that the lock-up system of the torque convertor is in its OFF state and the speed range detector means detects that the transmission is placed in the first speed.

Preferably, the overrun detector means is equipped with an engine revolution speed sensor for detecting the revolution speed of the engine and judges that the overrun of the engine has occurred when the revolution speed detected by the engine revolution speed sensor is equal to a predetermined value (e.g., a value specified in its specification) or more.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIG. 1 is a perspective view of the external appearance of the bulldozer;

FIG. 2 is a skeleton diagram of a power transmission system;

FIG. 3 is a schematic block diagram of the overall construction of the engine overrun preventing system;

FIG. 4 is a graph showing a running performance characteristic curve; and

FIG. 5 is a flow chart of a program.

PREFERRED EMBODIMENTS OF THE INVENTION

Reference is now made to the drawings for describing a preferred embodiment of an engine overrun preventing system for a vehicle according to the invention, as it is fitted to a bulldozer.

Figure 1:
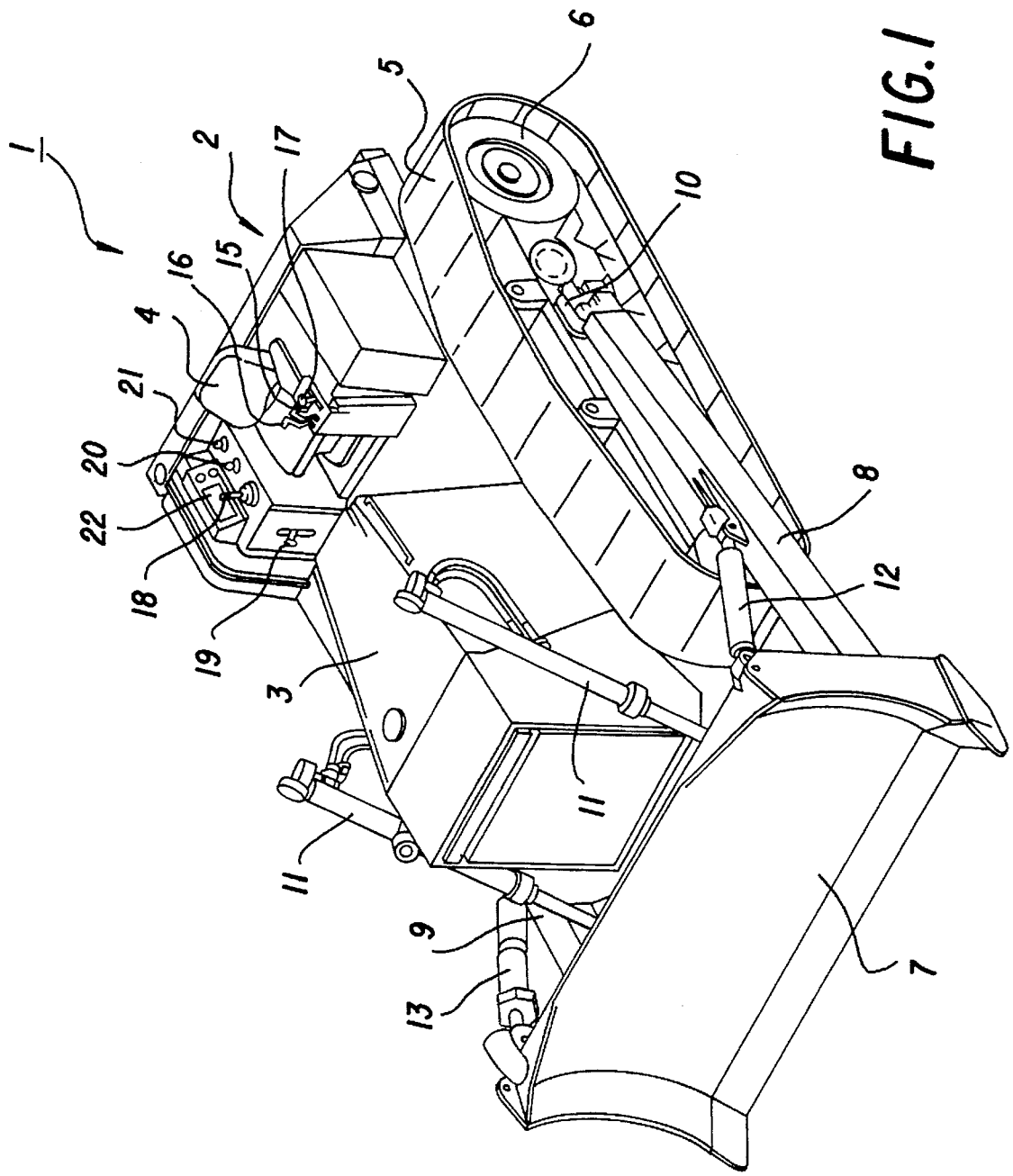
FIGS. 1 to 5 provide illustrations of a preferred embodiment of an engine overrun preventing system for a vehicle according to the invention, the system being fitted to a bulldozer.

Referring initially to FIG. 1, there is shown a perspective view of the external appearance of a bulldozer 1. The bulldozer 1 is provided with, on a vehicle body 2 thereof, a bonnet 3 for housing an engine (not shown) and an operator seat 4 for the operator who drives the bulldozer 1. Both the right side and left side of the vehicle body 2 are provided with crawler belts 5 for turning the vehicle body 2 or driving it back and forth. These crawler belts 5 are independently driven by their respective sprockets 6 actuated by driving force transmitted from the engine. Note that the crawler belt 5 and the sprocket 6 on the right side are not shown in the drawing.

There are disposed a blade 7 in front of the vehicle body 2 and straight frames 8, 9 on the right and left sides of the vehicle body 2, for supporting the blade 7 at the forward ends thereof. The base ends of these right and left straight frames 8, 9 are pivotally supported on and coupled to the vehicle body 2 by means of trunnions 10 in such a manner that the blade 7 can be lifted or lowered. Note that the trunnion 10 on the right side is not shown.

Disposed between the blade 7 and the vehicle body 2 are right and left blade lift cylinders 11 arranged in a pair for lifting or lowering the blade 7. For tilting the blade 7 to the right and left, there are provided a brace 12 between the blade 7 and the left straight frame 8 and a blade tilt cylinder 13 between the blade 7 and the right straight frame 9.

There are provided a steering lever 15, a forward/reverse drive lever 16 and a fuel control lever 17 on the left of the operator seat 4. The steering lever 15 is operated by moving it laterally, and the fuel control lever 17 is operated by moving it back and forth. The forward/reverse drive lever 16 is moved back and forth so as to be shifted in the forward, neutral or reverse position, for placing the vehicle body 2 in the forward or reverse three speed ranges or stopping the vehicle body 2. On the right of the operator seat 4, there are provided (i) a blade control lever 18 that is moved laterally, back and forth for lifting or lowering the blade 7 or tilting it to the right or left; (ii) a parking brake 19 which is moved up and down for operation; (iii) a speed range setting dial 20 for setting a speed range selected from the three speeds in forward and reverse, up to which the transmission is automatically shifted up during the forward or backward drive of the vehicle body 2; (iv) a lock-up selector switch 21 for switching the lock-up system of a torque convertor ON or OFF; and (v) a display unit 22. Although not shown in the drawing, there are provided a decelerator pedal, a clutch pedal and a brake pedal in front of the operator seat 4.

Figure 2:
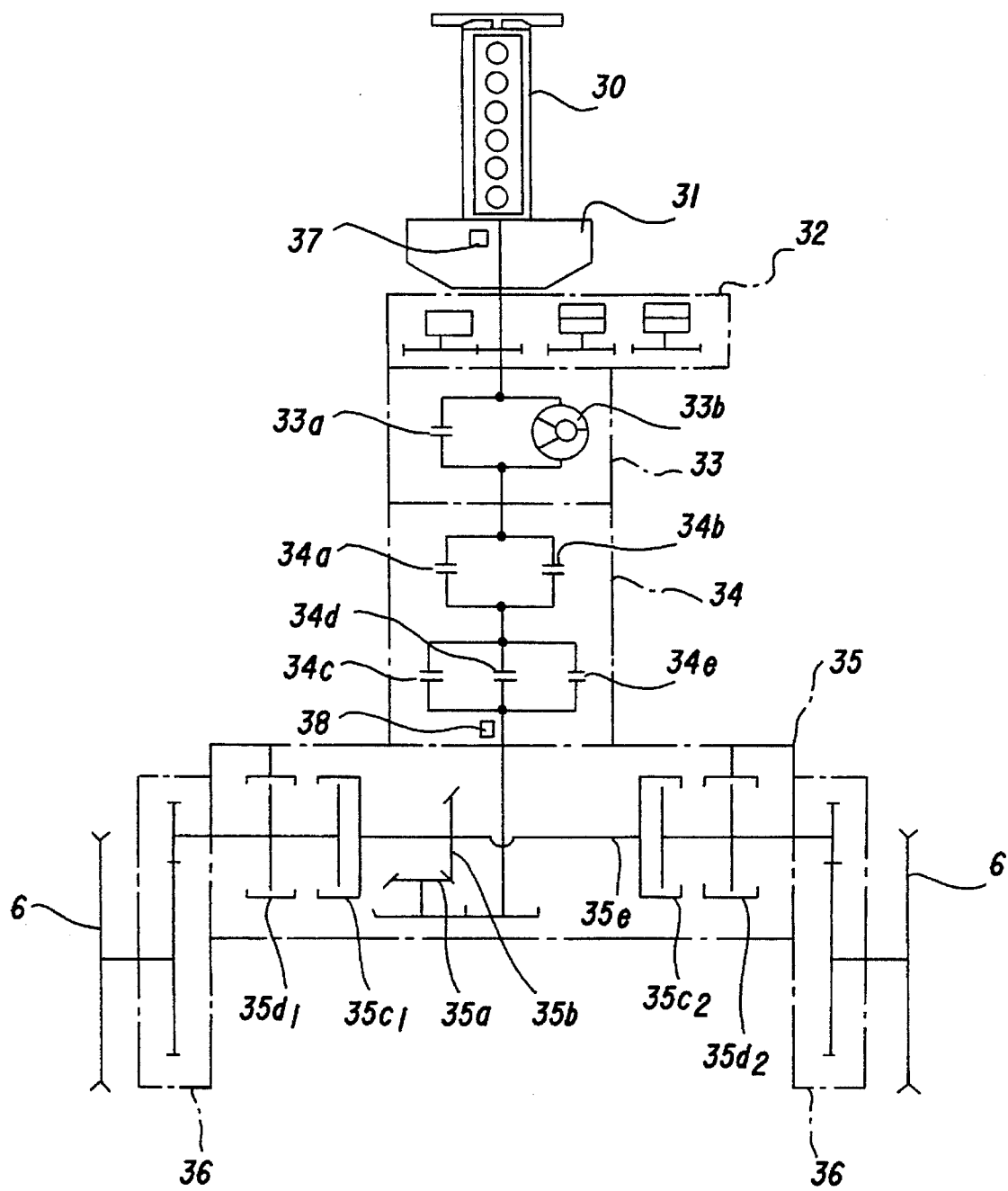

Referring to FIG. 2 that shows a power transmission system, rotary driving force from an engine 30 is transmitted to a torque convertor with a lock-up system 33 through a damper 31 and a PTO 32. The PTO 32 drives various hydraulic pumps including hydraulic pumps for working machines, and the torque convertor with a lock-up system 33 includes a lock-up clutch 33a and a pump 33b. Then, the rotary driving force is transmitted from the output shaft of the torque convertor 33 to a transmission 34 whose input shaft is coupled to the output shaft of the torque convertor 33. The transmission 34 is, for example, a planetary gear lubricated multiple-disc clutch transmission and includes forward and reverse clutches 34a, 34b and first to third clutches 34c to 34e so that the revolution speed of the output shaft of the transmission 34 can be shifted in three ranges in both forward and backward directions. The rotary driving force from the output shaft of the transmission 34 is transmitted to a steering unit 35 which includes a pinion 35a and a transverse shaft 35e on which disposed are a bevel gear 35b, right and left clutches $35c_1$, $35c_2$ arranged in a pair, and right and left brakes $35d_1$, $35d_2$ arranged in a pair. Thereafter, the rotary driving force is transmitted to right and left final speed reduction mechanisms 36 arranged in a pair so that each of the sprockets 6 for running the crawler belts 5 (not shown in FIG. 2) is driven. Reference numeral 37 denotes an engine revolution sensor for detecting the revolution speed of the engine 30 and reference numeral 38 denotes a transmission output shaft revolution sensor for detecting the revolution speed of the output shaft of the transmission 34.

Figure 3:
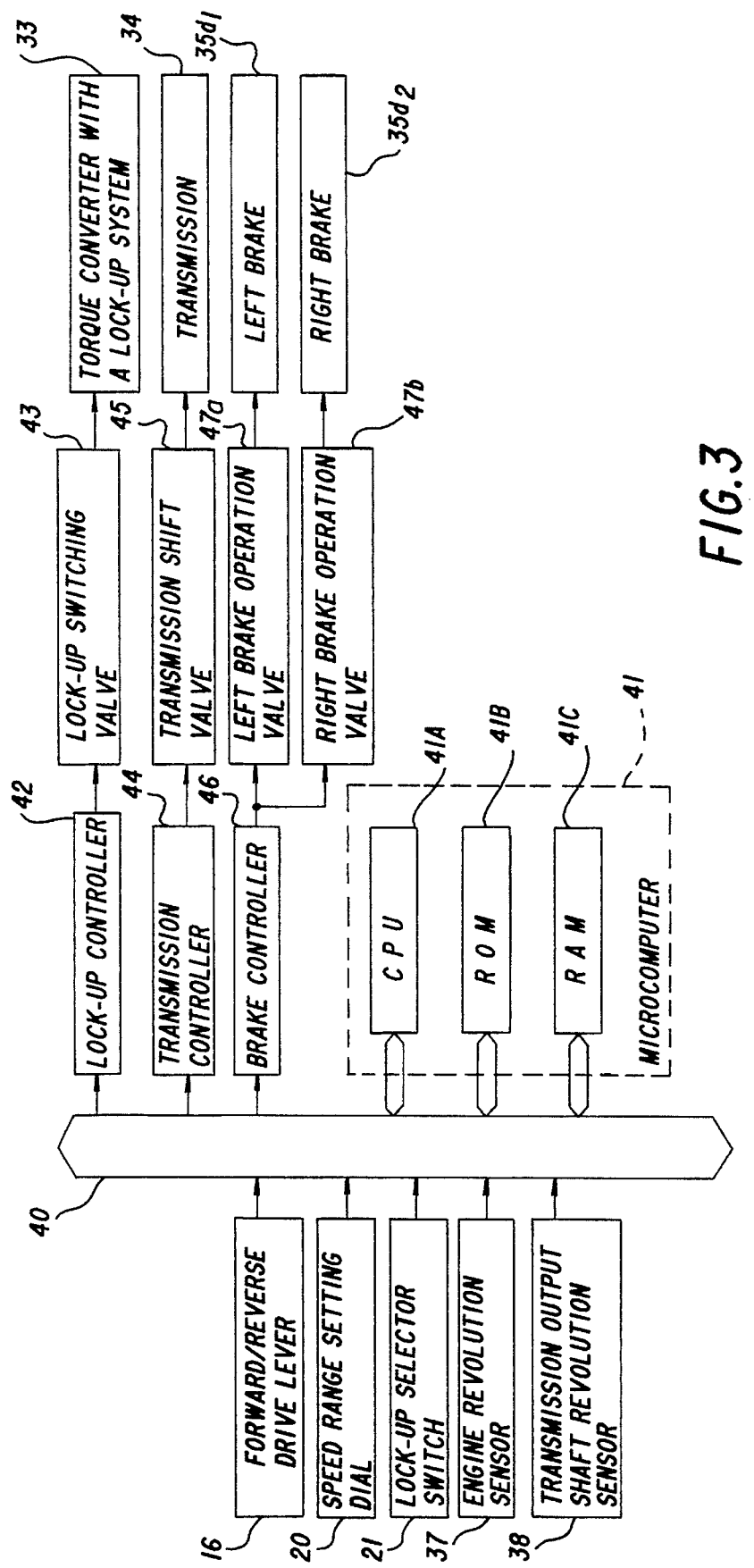

Referring to FIG. 3 that schematically shows the overall construction of the engine overrun preventing system for a vehicle according to the invention, the following data items are provided over a bus 40 to a microcomputer 41: (i) positional data from the forward/reverse drive lever 16, regarding which of the positions (forward position, neutral position, reverse position) the lever 16 is placed in; (ii) set speed range data from the speed range setting dial 20, regarding a speed range up to which the transmission 34 is automatically shifted up during the forward or backward drive of the vehicle body 2; (iii) lock-up (LU)/torque converting (TC) selecting instruction from the lock-up selector switch 21, instructing to switch the lock-up system of the torque convertor 33 ON or OFF; (iv) revolution speed data from the engine revolution sensor 37, regarding the revolution speed of the engine 30; and (v) revolution speed data from the transmission output shaft revolution sensor 38, regarding the revolution speed of the output shaft of the transmission 34.

The microcomputer 41 is composed of a central processing unit (CPU) 41A for executing a specified program; a read only memory (ROM) 41B for storing this program and a lock-up ON/OFF control and gear change map; and a random access memory (RAM)41C serving as a working memory necessary for executing the program and as registers for various data. The program is executed in accordance with (i) the positional data, regarding which of the positions (forward position, neutral position, reverse position) the lever 16 is placed in; (ii) the set speed range data regarding a speed range up to which the transmission 34 is automatically shifted up; (iii) the LU/TC selecting instruction for the torque convertor with a lock-up system 33; (iv) the revolution speed data of the engine 30; and (v) the revolution speed data of the output shaft of the transmission 34. By the execution of the program, the LU/TC instruction is supplied to a lock-up controller 42. The lock-up controller 42 then controls, based on the LU/TC instruction, a lock-up switching valve 43 for switching the lock-up system of the torque convertor 33 ON or OFF, so that the torque convertor 33 is brought into its locked-up state or torque converting state. A gear change instruction for the transmission 34 is supplied to a transmission controller 44 which controls, based on the gear change instruction, a transmission shift valve 45, for shifting the transmission 34 into one of the forward and reverse speed ranges or neutral position.

Further, a speed reduction instruction for reducing the speed of the vehicle body 2 is supplied to a brake controller 46 for controlling the right and left brakes $35d_1$, $35d_2$ in the steering unit 35. Based on the speed reduction instruction, the brakes $35d_1$, $35d_2$ are controlled by the brake controller 46 with the help of brake operation valves 47a, 47b which are provided in correspondence with the brakes $35d_1$, $35d_2$, respectively.

Figure 4:
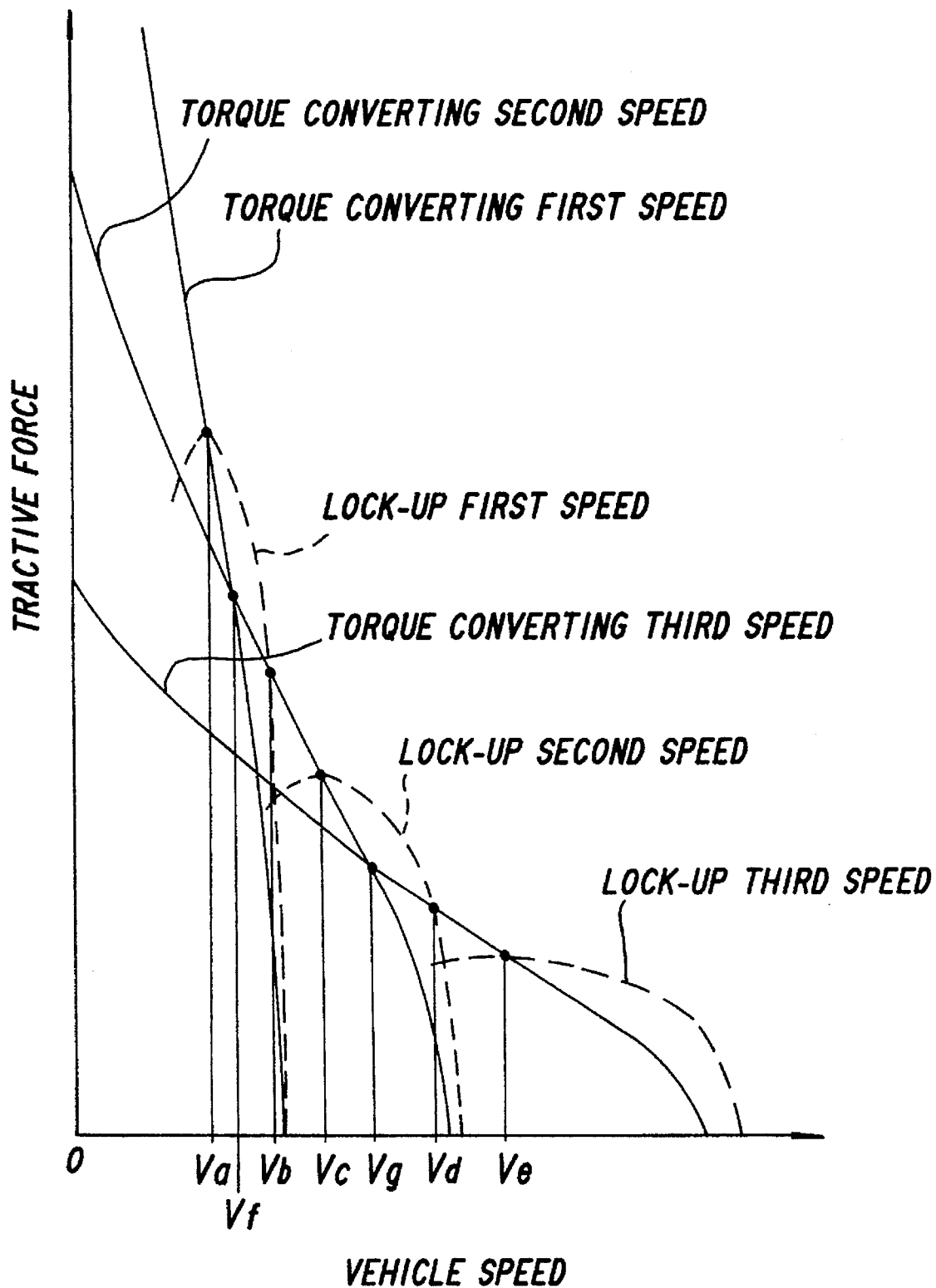

In the above-mentioned lock-up ON/OFF control and gear change map, the locked-up/torque converting state of the torque convertor with a lock-up system 33 and the speed ranges for the transmission 34 are plotted against vehicle speeds, in accordance with the running performance characteristic curve shown in FIG. 4 in which the tractive force is plotted against the vehicle speed for the vehicle body 2. In FIG. 4, the full lines indicated by "torque converting first speed", "torque converting second speed" and "torque converting third speed" represent the cases where the transmission 34 is placed in the first gear, the second gear and the third gear respectively, when the torque convertor 33 is in its torque converting state (i.e., the lock-up system is switched OFF). The dotted lines indicated by "lock-up first speed", "lock-up second speed" and "lock-up third speed" represent the cases where the transmission 34 is placed in the first gear, the second gear and the third gear respectively, when the torque convertor 33 is in its locked-up state (i.e., the lock-up system is switched ON). In the above map, the locked-up/torque converting state of the torque convertor 33 and the speed ranges for the transmission 34 are plotted against vehicle speeds as will be described. When the LU/TC selecting instruction for the torque convertor 33 sent from the lock-up selector switch 21 instructs to select "locked-up state", the state of the torque convertor 33 and speed range will be changed as the vehicle speed increases, in such a way that: "torque converting first speed" is selected up to a vehicle speed Va, "lock-up first speed" between vehicle speeds Va to Vb, "torque converting second speed" between vehicle speeds Vb to Vc, "lock-up second speed" between vehicle speeds Vc to Vd, "torque converting third speed" between vehicle speeds Vd to Ve, and "lock-up third speed" after the vehicle speed Ve. As the vehicle speed decreases, "lock-up third speed" is selected up to the vehicle speed Ve, "torque converting third speed" between the vehicle speeds Ve to Vd, "lock-up second speed" between the vehicle speeds Vd to Vc, "torque converting second speed" between the vehicle speeds Vc to Vb, "lock-up first speed" between the vehicle speeds Vb to Va, and "torque converting first speed" after the vehicle speed Va. On the other hand, when the LU/TC selecting instruction for the torque convertor 33 sent from the lock-up selector switch 21 instructs to select "torque converting state", the state of the torque convertor 33 and speed range will be changed as the vehicle speed increases in such a way that: "torque converting first speed" is selected up to a vehicle speed Vf, "torque converting second speed" between vehicle speeds Vf to Vg, and "torque converting third speed" after the vehicle speed Vg. As the vehicle speed decreases, "torque converting third speed" is selected up to the vehicle speed Vg, "torque converting second speed" between the vehicle speeds Vg to Vf, and "torque converting first speed" after the vehicle speed Vf.

Figure 5:
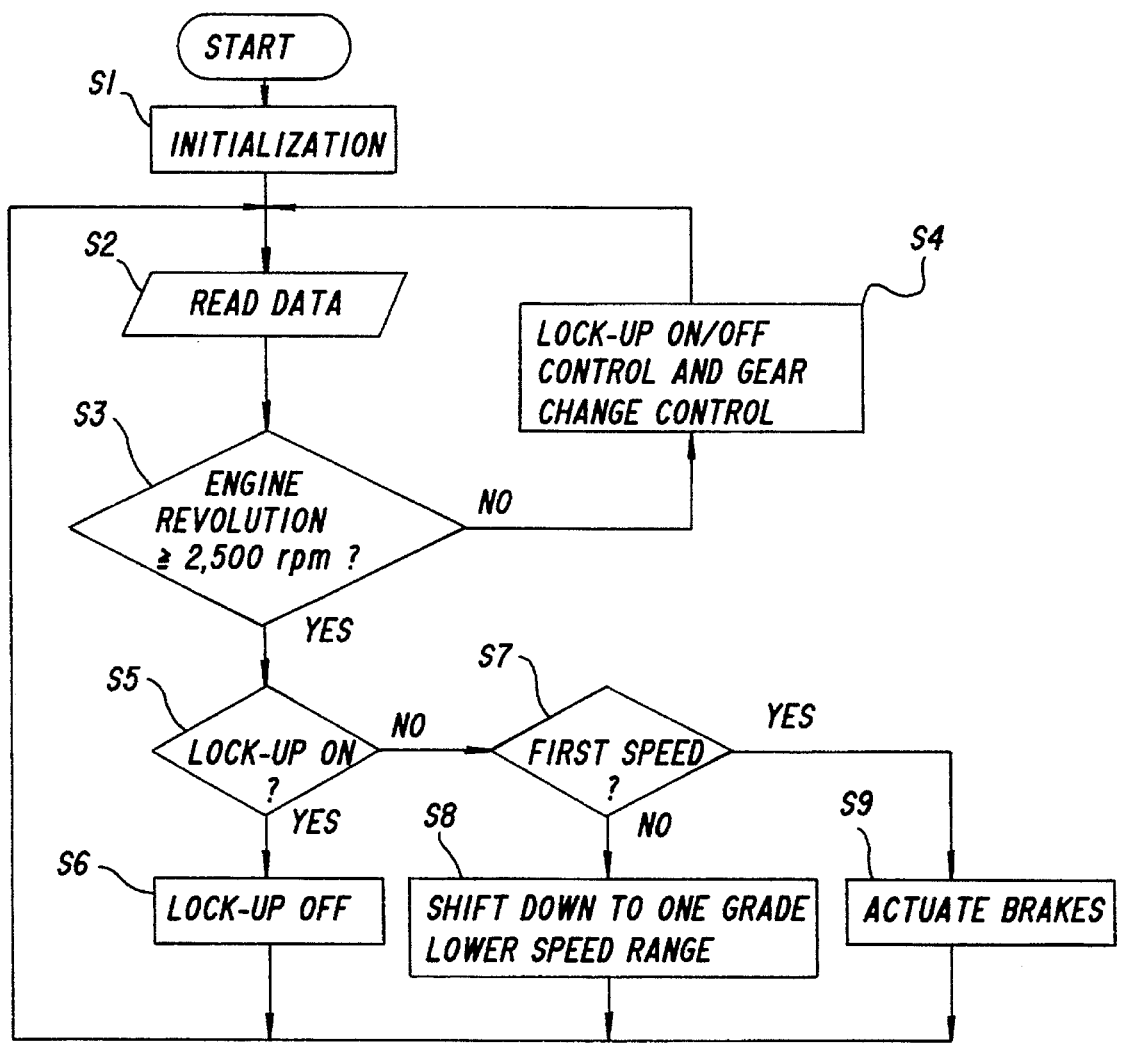

Referring to the flow chart of FIG. 5, the basic operation of the above-described engine overrun preventing system for a vehicle will be described below.

Step 1: Power is loaded to start execution of the specified program and to clear all data stored in the registers of the RAM 41C of the microcomputer 41.

Step 2: The following data items are read: (i) positional data from the forward/reverse drive lever 16, regarding which of the positions (forward position, neutral position, reverse position) the lever 16 is placed in; (ii) set speed range data from the speed range setting dial 20, regarding a speed range up to which the transmission 34 is automatically shifted up; (iii) LU/TC selecting instruction from the lock-up selector switch 21, instructing to switch the lock-up system of the torque convertor 33 ON or OFF; (iv) revolution speed data from the engine revolution sensor 37, regarding the revolution speed of the engine 30; and (v) revolution speed data from the transmission output shaft revolution sensor 38, regarding the revolution speed of the output shaft of the transmission 34.

Step 3: The bulldozer 1 rolls down a slope, being accelerated, for example, by the weight of the vehicle body 2 so that the engine 30 is reversely driven. In this situation, the overrun of the engine 30 is detected by judging whether the revolution speed of the engine 30 exceeds a value specified in its specification (=2,500 rpm in this embodiment).

Step 4: If the overrun of the engine 30 is not detected, based on the positional data from the forward/reverse drive lever 16 and the LU/TC selecting instruction for the torque convertor 33, a lock-up ON/OFF control instruction for controlling the lock-up system of the torque convertor 33 by means of the lock-up controller 42 and the lock-up switching valve 43 is released corresponding to the vehicle speed on the lock-up ON/OFF control and gear change map. Also, a gear change instruction for shifting the transmission 34 into one of the forward and reverse speed ranges or neutral position by means of the transmission controller 44 and the transmission shift valve 45 is released corresponding to the vehicle speed. When the transmission 34 is shifted up, gear change is carried out within the set speed range determined by the set speed range data mentioned earlier. Note that more details are set out in Japanese Patent Publication Laid-Open No. 5-93429 (1993).

Step 5 to Step 9: If the overrun of the engine 30 is detected, the present locked-up/torque converting state of the torque convertor 33 is detected from the preceding lock-up ON/OFF instruction and the present speed range of the transmission 34 is detected from the preceding gear change instruction. Then, a control for adjusting the overrun of the engine 30 is performed with the following priority, according to whether the torque convertor 33 is in its locked-up state or torque converting state (i.e., whether the lock-up system is ON or OFF) and according to whether the transmission 34 is placed in another range (the second or third speed) than the first speed.

1. Where the lock-up system is ON:

An instruction is released for switching the lock-up system of the torque convertor 33 OFF by means of the lock-up controller 42 and the lock-up switching valve 43. The switch-off of the lock-up system causes a slip in the torque convertor 33 in the revolution transmitted from the input shaft of the transmission 34 to the engine 30 by reverse drive, so that the overrun of the engine 30 due to reverse drive can be prevented.

2. Where the second speed or third speed is "in":

If the lock-up system of the torque convertor 33 is OFF and the present speed range of the transmission 34 is the second or third speed, an instruction is released for automatically shifting the transmission 34 to a one grade lower speed range by means of the transmission controller 44 and the transmission shift valve 45. The shift-down to a one grade lower speed range reduced the vehicle speed by engine brake, and thereby reduces the revolution transmitted from the steering unit 35 to the engine 30 by reverse drive, so that the overrun of the engine 30 can be prevented.

3. Other conditions:

If the lock-up system of the torque convertor 33 is OFF and the present speed range of the transmission 34 is the first speed, a speed reduction instruction is released for actuating the right and left brakes $35d_1$, $35d_2$ in the steering unit 35 by means of the brake controller 46 and the brake operation valves 47a, 47b. The actuation of the brakes $35d_1$, $35d_2$ reduces vehicle speed and thereby reduces the revolution transmitted to the engine 30 by reverse drive, so that the overrun of the engine 30 caused by reverse drive can be prevented. This speed reduction also has the effect of maintaining vehicle speed so as to give a good ride to the operator.

Although the foregoing embodiment has been particularly described with a vehicle which includes the torque convertor with a lock-up system 33 and the transmission 34 capable of automatically performing shift-down without requiring manual operation by the operator, it is readily apparent that the invention is applicable to vehicles having a direct transmission which does not include a torque convertor with a lock-up system or vehicles which do not have a transmission for automatically performing shift-down. In the former case, when the engine 30 is overloaded, vehicle speed is reduced by shift-down to a one grade lower speed range and/or by actuating the brake. In the latter case, when the engine 30 is overloaded, vehicle speed is reduced by switching the lock-up system OFF and/or actuating the brake. Where the invention is applied to vehicles which have a direct transmission including no torque convertor and does not have a transmission capable of automatically performing shift-down, vehicle speed is reduced by actuating the brake.

While the steering lever 15 and the forward/reverse drive lever 16 are not formed as one unit in the foregoing embodiment, it is obvious that they may be integrally formed as a forward/reverse drive/steering lever. Such a forward/reverse drive/steering lever is designed to be laterally movable at each of the forward position, neutral position and reverse position, these positions having been described with the forward/reverse drive lever 16 (this lever is movable back and forth) in the foregoing embodiment.

In the foregoing embodiment, automatic gear change is performed by the forward/reverse drive lever 16 which is moved back and forth so as to be placed in the forward, neutral or reverse position and the speed range setting dial 20 for setting a speed range which is selected from three speed ranges in forward and reverse and up to which shift-up is automatically carried out during the forward or backward drive of the vehicle body 2. However, the invention is applicable to vehicles in which the forward/reverse drive lever is operated back and forth to be placed in one of the forward first speed, forward second speed, forward third speed, reverse first speed, reverse second speed and reverse third speed positions or neutral position so that not only the drive direction but also a speed range up to which shift-up is automatically carried out is set by the operation of the forward/reverse drive lever.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine overrun preventing system for use in a vehicle, comprising:
   (a) overrun detector means for detecting the overrun of an engine; and
   (b) overrun control means for preventing the overrun of the engine when the overrun of the engine is detected by the overrun detector means, by actuating a brake to reduce vehicle speed.

2. The engine overrun preventing system for use in a vehicle, as claimed in claim 1, wherein the overrun detector means is equipped with an engine revolution speed sensor for detecting the revolution speed of the engine and judges that the overrun of the engine has occurred when the revolution speed detected by the engine revolution speed sensor is equal to a predetermined value or more.

3. An engine overrun preventing system for use in a vehicle, comprising:
   (a) lock-up state detector means for detecting the ON or OFF state of a lock-up system provided in a torque convertor;
   (b) overrun detector means for detecting the overrun of an engine; and
   (c) overrun control means for preventing the overrun of the engine when the overrun of the engine is detected by the overrun detector means, by switching the lock-up system of the torque convertor OFF to cause a slip if the lock-up state detector means detects that the lock-up system is in its ON state.

4. An engine overrun preventing system for use in a vehicle, comprising:
   (a) speed range detector means for detecting a speed range in which an automatic transmission is presently placed;
   (b) overrun detector means for detecting the overrun of an engine; and
   (c) overrun control means for preventing the overrun of the engine when the overrun of the engine is detected by the overrun detector means, by shifting the transmission into a speed range which is one grade lower than the detected speed range and reducing vehicle speed by engine brake, if the speed range detector means detects that the transmission is placed in another speed range than a first speed.

5. An engine overrun preventing system for use in a vehicle, comprising:
   (a) lock-up state detector means for detecting the ON or OFF state of a lock-up system provided in a torque convertor;
   (b) overrun detector means for detecting the overrun of an engine; and
   (c) overrun control means for preventing the overrun of the engine when the overrun of the engine is detected by the overrun detector means, by (i) switching the lock-up system OFF to cause a slip, if the lock-up state detector means detects that the lock-up system of the torque convertor is in its ON state; and (ii) actuating a brake to reduce vehicle speed, if the lock-up state detector means detects that the lock-up system of the torque convertor is in its OFF state.

6. An engine overrun preventing system for use in a vehicle, comprising:
   (a) speed range detector means for detecting a speed range in which an automatic transmission is presently placed;
   (b) overrun detector means for detecting the overrun of an engine; and
   (c) overrun control means for preventing the overrun of the engine when the overrun of the engine is detected by the overrun detector means, by (i) shifting the transmission into a speed range which is one grade lower than the detected speed range and reducing vehicle speed by engine brake if the speed range detector means detects that the transmission is placed in another speed range than a first speed and (ii) actuating a brake to reduce vehicle speed if the speed range detector means detects that the transmission is placed in the first speed.

7. An engine overrun preventing system for use in a vehicle, comprising:
   (a) lock-up state detector means for detecting the ON or OFF state of a lock-up system provided in a torque convertor;
   (b) speed range detector means for detecting a speed range in which an automatic transmission is presently placed;
   (c) overrun detector means for detecting the overrun of an engine; and
   (d) overrun control means for preventing the overrun of the engine when the overrun of the engine is detected by the overrun detector means, by (i) switching the lock-up system OFF to cause a slip, if the lock-up state detector means detects that the lock-up system of the torque convertor is in its ON state; (ii) shifting the transmission into a speed range which is one grade lower than the detected speed range and reducing vehicle speed by engine brake, if the lock-up state detector means detects that the lock-up system of the torque convertor is in its OFF state and the speed range detector means detects that the transmission is placed in other speed ranges than a first speed; and (iii) actuating a brake to reduce vehicle speed if the lock-up state detector means detects that the lock-up system of the torque convertor is in its OFF state and the speed range detector means detects that the transmission is placed in the first speed.

8. An engine overrun preventing system for use in a vehicle, comprising:
   (a) overrun detector means for detecting the overrun of an engine; and
   (b) overrun control means for preventing the overrun of the engine when the overrun of the engine is detected by the overrun detector means, by actuating a brake to reduce vehicle speed,
   wherein the overrun detector means is equipped with an engine revolution speed sensor for detecting the revolution speed of the engine and judges that the overrun of the engine has occurred when the revolution speed detected by the engine revolution speed sensor is equal to a predetermined value or more.

* * * * *